United States Patent [19]

Yarnell

[11] 4,409,859
[45] Oct. 18, 1983

[54] SHIFT-RAIL INTERLOCK BRACKET FOR COMPOUND TRANSMISSION

[75] Inventor: James A. Yarnell, Temperance, Mich.

[73] Assignee: Dana Corporation, Toledo, Ohio

[21] Appl. No.: 259,129

[22] Filed: Apr. 30, 1981

[51] Int. Cl.³ .............................................. G05G 5/10
[52] U.S. Cl. ....................................... 74/477; 74/745
[58] Field of Search ................................. 74/745, 477

[56] References Cited

U.S. PATENT DOCUMENTS

| | | | |
|---|---|---|---|
| 1,887,943 | 11/1932 | Padgett et al. | 74/477 |
| 2,362,925 | 11/1944 | Peterson et al. | 74/477 |
| 2,853,889 | 9/1958 | Quayle | 74/477 |
| 3,498,155 | 3/1970 | Ivanchich et al. | 74/745 |
| 3,648,536 | 3/1972 | Maina | 74/477 X |
| 3,939,724 | 2/1976 | Takahashi et al. | 74/477 X |
| 3,955,437 | 5/1976 | Heintz | 74/473 R |
| 4,060,005 | 11/1977 | Bost | 74/477 |
| 4,120,212 | 10/1978 | Philipsen | 74/477 X |
| 4,296,642 | 10/1981 | Schetter | 74/477 |

*Primary Examiner*—Allan D. Herrmann
*Attorney, Agent, or Firm*—Frank B. McDonald

[57] ABSTRACT

A compound transmission defining main and auxiliary gearboxes includes an auxiliary shift rail extending into both gearboxes for effecting joint interlock of the two units. The auxiliary shift rail includes an interlock bracket for actuation of a shift interlock element contained within the main gearbox. In a preferred embodiment, the bracket contains a pair of recesses disposed for engaging an interlock plunger, the recess having an angularly offset axis, perpendicular to but not intersecting the axis of the auxiliary shift rail. In another preferred embodiment, the bracket couples the auxiliary shift rail with a second axially spaced shift rail whereby axial movement of the auxiliary shift rail effects like movement of the second shift rail, the latter rail containing a pair of interlock plunger-receiving recesses.

11 Claims, 5 Drawing Figures

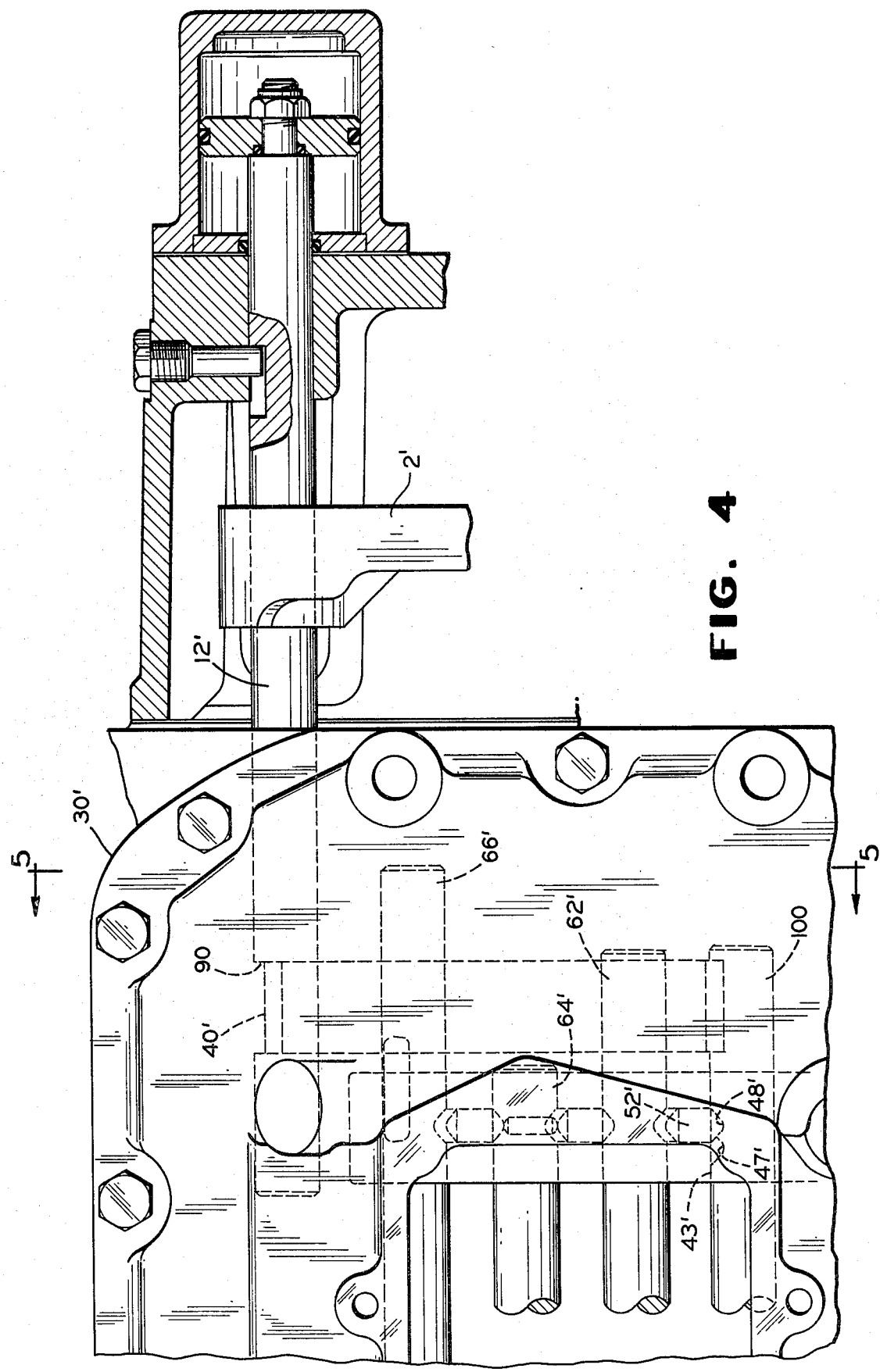

SHIFT-RAIL INTERLOCK BRACKET FOR COMPOUND TRANSMISSION

BACKGROUND

This invention relates to transmissions of the compound type, which are comprised of main as well as auxiliary or "piggyback" units. More particularly, this invention relates to apparatus for jointly interlocking such units by means of a single control apparatus, typically a range or auxiliary shift rail, which extends from within an auxiliary gearbox unit to and within a main gearbox unit.

Dimensional constraints generally dictate where and how various gears and shift rail apparatus are placed and oriented respectively, within a single transmission unit. When compound transmissions involving multiple gearbox sections are employed, the dimensional constraints become greater, thus more critical particularly as to those elements within one gearbox unit which must interface with elements in an adjacent unit. As this invention relates specifically to shift rail and associated interlock compatibility, the dimensional constraints pertinent thereto could be greatly relaxed if the range shift rail did not have to be positioned so as to be "in-line" with the main gearbox shift rails. Thus, greater flexibility would result if the range shift rail were more easily accomodated when offset or asymmetrically positioned with respect to main gearbox shift rails, thus making more auxiliary gearboxes compatible for assembly with greater numbers and varieties of main gearbox units.

SUMMARY

The invention hereof embodies an interlock bracket on a range shift rail for providing greater interface flexibility between main and auxiliary gearbox units. The bracket permits the use of range or auxiliary shift rails which are asymmetrically positioned with respect to the normally symetrically positioned shift rails within a standard main gearbox. In a first preferred embodiment, the bracket is fixed to the range shift rail, specifically on a portion thereof positioned within a main gearbox. The bracket includes a pair of recesses disposed for engagement with an interlock plunger, the recesses having angularly offset axes, perpendicular to but not intersecting the axis of the range shift rail. A second preferred embodiment of the bracket couples a range shift rail with a second shift rail which is axially spaced therefrom within the main gearbox unit, whereby axial movement of the range shift rail effects like movement of the second shift rail. The second shift rail contains a pair of recesses disposed for engagement with an interlock plunger. Both embodiments are capable of effecting joint interlock of main and auxiliary gearbox units by a single control apparatus.

BRIEF DESCRIPTION OF THE DRAWINGS

FIG. 4 is a sectional plan view of a portion of main and auxiliary gearbox units depicting a second preferred embodiment of the bracket of this invention, the bracket herein serving to couple the range shift rail with a shift rail of the main gearbox.

DETAILED DESCRIPTION OF PREFERRED EMBODIMENTS

Figure 1:
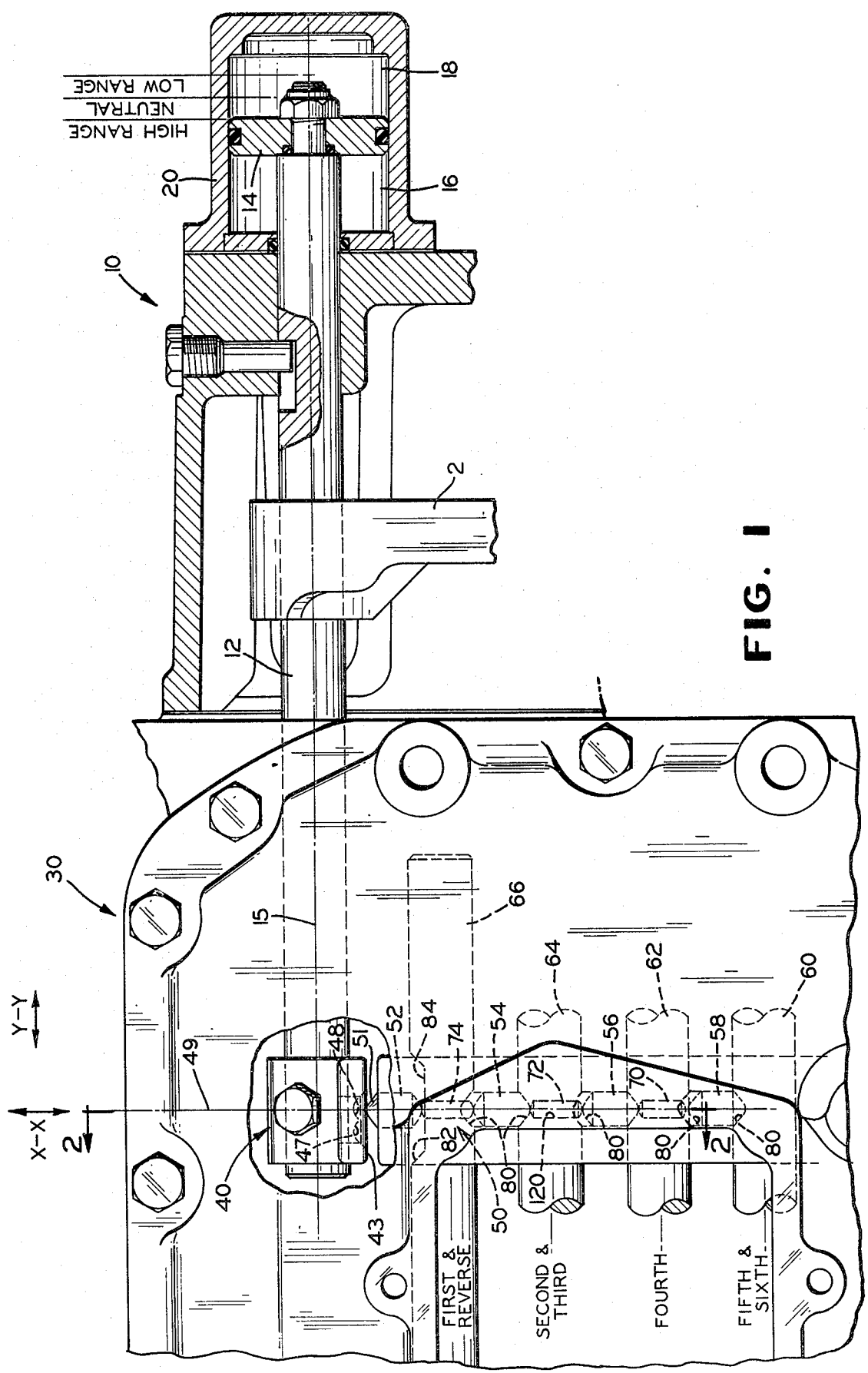
FIG. 1 is a fragmentary sectional plan view of main and auxiliary gearbox units incorporating a range shift rail extending therebetween, and includes a view of one preferred embodiment of the bracket of this invention fixed to the rail and coacting with shift interlock elements contained within the main gearbox.
Figure 2:
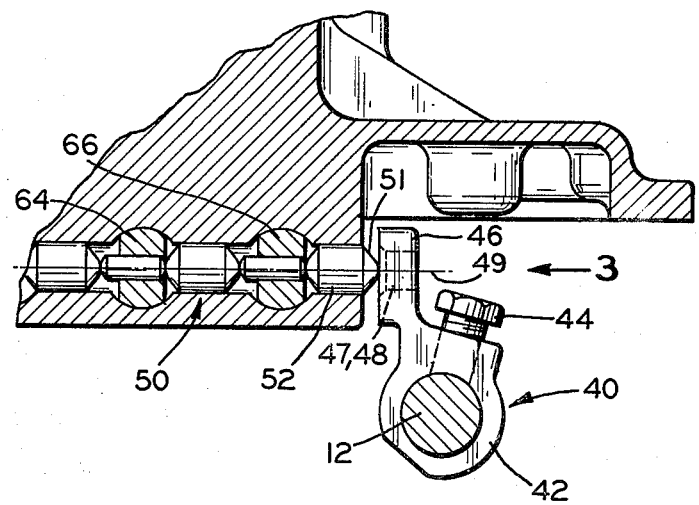
FIG. 2 is a view along lines 2—2 of FIG. 1, which shows the configuration of the bracket of FIG. 1 as positioned on the range shift rail, and also shows the offset or asymetrical position of the range shift rail relative to the shift rails of the main gearbox.

Referring to FIG. 1, an auxiliary gearbox unit 10 encases one end of a range shift rail 12. The shift rail 12 is reciprocally moveable between high, neutral, and low range positions by means of an air cylinder 20 fixed to the unit 10. A shift fork 2 is affixed to the rail 12 to shift an auxiliary clutch collar (not shown) between high and low positions. The unit 10 includes an air piston 14 which defines air chambers 16 and 18 on respective sides thereof. The opposite end of the shift rail 12 extends into a main gearbox unit 30. In this first preferred embodiment, a bracket 40 is fixed to the shift rail 12, the bracket being positioned thereon for coacting with a shift interlock system 50 which is contained within the main gearbox unit 30. FIG. 2 depicts in more detail the manner in which the bracket 40 coacts with the interlock system 50. Thus, the bracket 40 includes a rail-engaging body portion 42 fastened to the rail 12 by a threaded fastener 44. An interlock coacting portion 46 extends outwardly of the body portion 42, the portion 46 including at least one recess 48 therein which is disposed for receivingly engaging an interlock plunger 52 of the shift interlock system 50. The plunger 52 has a conical or tapered end 51, which forms a cam for facilitating engagement with and ejectment from the recess 48. The axis 49 of the recess 48 is, in this first preferred embodiment, angularly offset from the axis 15 (FIG. 1) of rail 12, and thus although the axes are perpendicular, they do not intersect. It will therefore be appreciated by those skilled in the art that the range shift rail 12 can be easily interfaced with standard main gearbox shift rails without special alignment consideration when a bracket 40 is employed.

Referring back to FIG. 1, the first preferred embodiment shown in FIGS. 1 and 2 includes a main gearbox 30 which incorporates six forward gear ratios and one reverse gear ratio. When combined with an auxiliary gearbox unit 10, having two gear ratios (high and low range), a compound transmission is defined which has twelve total available forward ratios, and two reverse ratios. It will be appreciated that the main and auxiliary units shown and described herein are for illustration only; and that alternative gearing arrangements may be employed which also incorporate this invention.

In this particular preferred embodiment, a primary design parameter is that the low range gear of the auxiliary gearbox is rendered unavailable by shift interlock means in all gears except first and reverse. This provides for the elimination of an objectionable noise level otherwise created by the higher speed of rotation of the low range auxiliary gear when operating with main unit gears having speed ratios higher than those of first and reverse. Thus, as shown in FIG. 1, the interlock system 50 comprises a set of interlock plungers 52, 54, 56 and 58 which, with interjacently positioned interlock pins 70, 72, and 74, cooperate within transversely aligned bores 120 within each of the shift rails 60, 62, 64 and 66 to provide desired interlock movement. Each end of each bore terminates at a recess 80 concentric therewith; thus a plurality of transversely aligned recesses 80 are thereby defined for receivingly engaging the various plungers. It will be noted that interlock pins 70, 72, and 74 and plungers 52, 54, 56 and 58 are free-floating and are moved in directions of arrows X—X, thus transversely to the axial movements in the directions of arrows Y—Y of shift rails 60, 62, 64, and 66. Each of the plungers have ends 51 defining cams whereby forces imparted thereon by axial movements of the rails will effect transverse movement of the plungers via coaction thereof with the transversely aligned recesses 80 in the rails. It will also be noted that in this preferred embodiment, the shift rail 66 is a first and reverse shift rail, and unlike the other shift rails contains notched spaces 82 and 84 for first and reverse gear positions, respectively. Thus, neither the first or reverse axial position of shift rail 66 will effect a restraint of movement of shift rail 12 via bracket 40, because by virtue of the spaces the interlock plunger 52 will regardless of the position of shift rails 60, 62, or 64 always be free to move out of recesses 47 or 48. It will be appreciated, however, that the non-neutral positions of any of the other shift rails 60, 62 or 64 (those for gears higher than first) will prevent axial movement of the shift rail 12 via bracket 40, because the interlock plunger 52 will be held in constant engagement with either recess 47 or 48.

Figure 3:
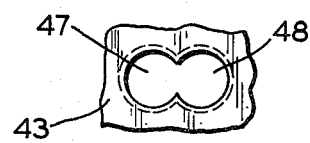
FIG. 3 is a view at 3 of FIG. 2, which shows chamfered bores in a preferred embodiment of the bracket, the bores defining a pair of recesses disposed for receivingly engaging an interlock plunger.

In order that a power take-off unit (not shown) may be conviently accomodated via the compound transmission described herein, it is desired that there be means for inactivating the auxiliary gearbox, which in traditional vehicles is positioned intermediate the main gearbox and the driving wheels thereof. Thus a neutral position is provided between the high and low range positions in the preferred embodiment of the auxiliary gearbox unit 10 of FIG. 1. Referring to FIGS. 2 and 3, the bracket 40 of FIG. 2 contains a pair of recesses, 47 and 48, shown partially overlapping in FIG. 3 for dimensional convenience. The recess 48 provides means for receiving an end 51 of the interlock plunger 52 when the auxiliary gearbox 10 is in the high range position. The recess 47, on the other hand, is positioned to receive the end 51 of the plunger 52 when the gearbox 10 is in the neutral (between high and low range) position. In either auxiliary gearbox high range or neutral position, all gears remain available for combination therewith in the main gearbox. A non-recessed or flat surface 43 on the bracket 40 provides a means for "locking out" any gear in the main gearbox except first or reverse (see notched spaces 82 and 84) whenever the auxiliary gearbox 10 is in the low range position.

Thus, for illustration, referring to FIG. 1, if rail 64 (second and third gears) is in a position other than neutral, the plunger 54, pin 74 and plunger 52 will all be positioned in extreme upward positions, with the recess-engaging end 51 of the plunger 52 positioned in the recess 48 (as shown with auxiliary in high range). When however, (1) the rail 64 is returned to neutral, and (2) the range rail 12 is shifted into low range, the end 51 of the plunger 52 will rest against the flat surface 43 of the bracket 40 and the rail 64 will not be able to be returned to second or third gear (left or right of neutral). It will be apparent to one skilled in the art that the interlock feature hereof will not only apply to restraint of movement of main gearbox shift rails 60, 62, 64 and 66; but that the auxiliary shift rail 12 will also be restrained against movement whenever (1) the end 51 of plunger 52 engages either recess 47 or 48, and (2) the main gearbox is in a gear other than first or reverse.

Figure 5:
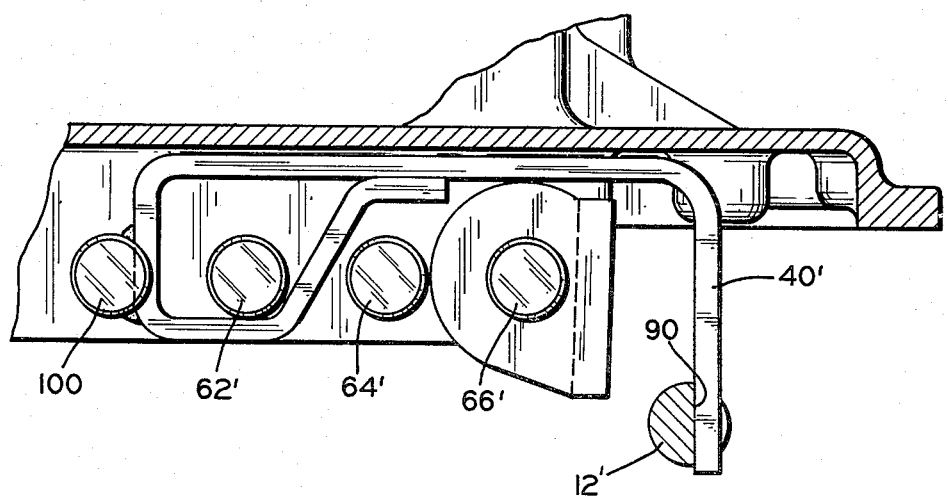
FIG. 5 is a view along lines 5—5 of FIG. 4, which shows the bracket arrangement relative to the shift rails, and also depicts the offset or asymmetrical position of the range shift rail relative to main gearbox shift rails.

An alternate embodiment of the bracket of this invention is as shown in FIGS. 4 and 5. Thus bracket 40' engages the range shift rail 12' within the main gearbox 30' via means of a slotted portion 90 in the rail 12. The bracket 40' extends to a floating interlock rail 100, and is fixed thereto so that the interlock rail 100 effectively acts as an extension of the bracket 40'. Thus axial movement of the range shift rail 12' results in like movement of the interlock rail 100. In this preferred embodiment, the rail 100 contains recesses 47' and 48', for receiving a shift interlock plunger 52', and also contains a flat surface 43', each element hereof cooperating in the manner of the analogous elements 47, 48, 52, and 43 as aforedescribed in the first preferred embodiment.

As may be appreciated, numerous other embodiments may be envisioned which fall within the invention hereunder claimed.

What is claimed is:

1. In a compound transmission comprising a main and an auxiliary gear box, wherein said main gear box includes a shift interlock system comprising a plurality of interlock elements, said transmission further comprising an auxiliary shift rail extending between and into each of said gear boxes; an improvement comprising an interlock bracket in fixed engagement with said shift rail, said bracket comprising means for activating said shift interlock system, said bracket further comprising means for engaging a portion of a shift interlock element, whereby said auxiliary shift rail is restrained against axial movement, said shift interlock element comprising means for ejection of said portion of said shift interlock element from said means for engaging said element, whereby said auxiliary shift rail is released for axial movement thereof, said bracket further comprising means for preventing axial movement of at least one main shift rail positioned within said main gearbox, wherein said means for engaging a portion of said shift interlock element comprises a recess within said bracket.

2. The compound transmission of claim 1 wherein said means for ejecting said portion of said element from said means for engaging said element comprises a cam surface on said element.

3. The compound transmission of claim 1 wherein said means for preventing axial movement of said main shift rail comprises a flat portion on said bracket, said portion having a surface parallel to the longitudinal axis of said shift rail, said surface disposed for restraining transverse movement of said interlock element in one direction.

4. The compound transmission of claim 1 wherein each of said means of said bracket lies on an axis, said axis perpendicular to the axis of said auxiliary shift rail, but angularly offset therefrom and not intersecting therewith.

5. The compound transmission of claim 1 wherein said bracket comprises means for engagement of a second shift rail axially spaced from said auxiliary shift rail, whereby said second shift rail is axially moved in follower action via movement of said auxiliary shift rail.

6. The compound transmission of claim 5 wherein said second shift rail comprises means for engaging said portion of said interlock element, whereby said auxiliary shift rail is restrained against axial movement.

7. The compound transmission of claim 6 wherein said second shift rail comprises means for ejecting said portion of said shift interlock element from said means for engaging said element, whereby said auxiliary shift rail is released for axial movement thereof.

8. The compound transmission of claim 6 wherein said second shift rail further comprises means for preventing axial movement of at least one main shift rail positioned within said main gearbox.

9. The compound transmission of claim 8, wherein said means for engaging a portion of said element comprises at least one recess within said second shift rail.

10. The compound transmission of claim 9 wherein said bracket is fixed to a portion of said shift rail internal of said main gearbox.

11. The compound transmission of claim 9 or 10 wherein said auxiliary shift rod is parallel to but asymmetrically positioned relative to shift rails within said main gearbox.

* * * * *